UNITED STATES PATENT OFFICE.

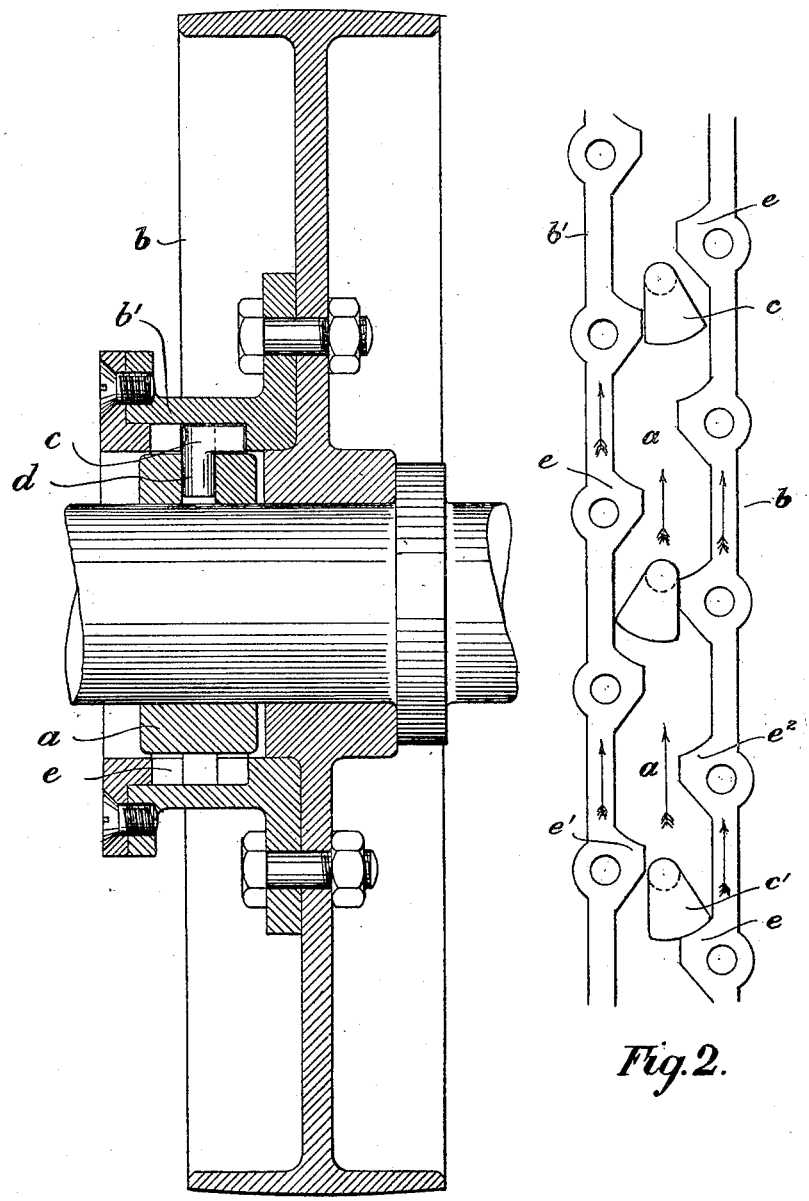

HARRY ERNEST WALTERS, OF WESTMINSTER, ENGLAND.

CLUTCH FOR THE TRANSMISSION OF POWER.

SPECIFICATION forming part of Letters Patent No. 684,482, dated October 15, 1901.

Application filed October 1, 1900. Renewed July 6, 1901. Serial No. 67,378. (No model.)

*To all whom it may concern:*

Be it known that I, HARRY ERNEST WALTERS, a subject of the Queen of Great Britain and Ireland, residing at 2 Great George street, Westminster, in the county of Middlesex, England, have invented new and useful Improvements in Clutches for the Transmission of Power, of which the following is a specification.

My invention relates to improvements in clutches for the transmission of power; and it consists, essentially, of a clutch in which positively-driven pawls are provided—that is to say, pawls that are actuated or thrown into and out of gear by projections independently of gravity or springs of any kind.

In my invention backlash is reduced to a minimum and there is no bursting or jamming action, the pawls pressing at right angles against the face of the teeth, the pawls becoming perfectly free directly pressure is removed.

In order that my invention may be readily understood and carried into effect, I will describe one form of applying it, with reference to the accompanying drawings, in which—

Figure 1 is a sectional elevation of a clutch constructed in accordance with my invention fitted to a shaft and pulley. Fig. 2 shows the form of the teeth in the pulley, the driving projections, and the pawls which engage said teeth as developed on a plane.

The same letters refer to the same parts in the different figures of the drawings.

$a$ is a sleeve attached to a shaft or spindle, on which spindle a driven pulley $b$ revolves, said pulley being recessed, as shown at $b'$. A series of pawls $c$ is arranged around the sleeve $a$, so that they can vibrate laterally upon pins $d$, formed on their under sides, which pins drop into holes provided in the sleeve $a$, or, as an alternative, the pawls may be made with holes in them, so that they may be dropped onto fixed pins provided around the sleeve $a$. In the recessed portion $b'$ of the pulley $b$ two series of teeth $e$ (see Fig. 2) are provided, with which teeth the pawls $c$, Fig. 2, engage, as hereinafter described. These teeth are staggered and project from the sides of the recess alternately and in opposite directions, thereby forming a zigzag channel.

The action of the clutch is as follows: Normally one at least of the pawls $c$ on sleeve $a$ will always be in position to be engaged by a tooth $e$ when pulley $b$ is revolved in the driving direction, as will be seen on reference to Fig. 2. Now, assuming that the movement of pulley $b$ in the driving direction, as shown by the arrows, is suspended and the pulley held stationary, the sleeve $a$, on which pawls $c$ are pivoted, can continue its revolution with the shaft in its driven direction, and under these conditions the pawls $c$ will be simply vibrated between the teeth or projections $e$ on pulley $b$. The pawl marked $c'$, Fig. 2, on coming into contact with projection marked $e'$ will be swung over on its pivot in one direction, and on coming into contact with the next projection in the series (marked $e^2$) it will be swung back again in the other direction, and so on throughout the series, all the pawls being actuated in a similar manner. In the case in which the driving power is applied to the shaft or spindle (instead of to the pulley $b$, as above described) and the revolution of said shaft or spindle is suspended, the shaft being held stationary and the pulley $b$ continuing its revolution in the driven direction, the movements or vibrations of the pawls $c$ will be precisely the same as above described.

What I claim as my invention, and desire to secure by Letters Patent, is—

1. In clutch mechanism, the combination, with a shaft and a wheel-hub, one of the said members being provided with two opposed series of teeth arranged circumferentially and having a zigzag channel between them; of a laterally-movable pawl pivotally supported by the other said member and arranged in the said channel, substantially as set forth.

2. In clutch mechanism, the combination, with a shaft provided with a sleeve, and a wheel-hub provided with a recess inclosing the sleeve and having two opposed series of teeth which form a zigzag channel around the sleeve; of laterally-movable pawls pivoted to the said sleeve and arranged in the said channel, substantially as set forth.

In testimony whereof I have signed my name to this specification in the presence of two subscribing witnesses.

HARRY ERNEST WALTERS.

Witnesses:
   L. R. CASEY,
   B. ASSERSOE.